Patented June 3, 1924.

1,496,257

UNITED STATES PATENT OFFICE.

CLINTON E. DOLBEAR, OF SAN FRANCISCO, CALIFORNIA, ASSIGNOR TO INDUSTRIAL RESEARCH CO., OF SAN FRANCISCO, CALIFORNIA.

METHOD OF SEPARATING SOLUBLE SALTS.

No Drawing. Original application filed October 20, 1923, Serial No. 669,749. Divided and this application filed December 17, 1923. Serial No. 681,297.

*To all whom it may concern:*

Be it known that I, CLINTON E. DOLBEAR, a citizen of the United States, residing at San Francisco, in the county of San Francisco and State of California, have invented certain new and useful Improvements in Methods of Separating Soluble Salts, of which the following is a specification.

This invention relates to the separation of soluble salts.

The present case is a true division of an application filed by me October 20, 1923, Serial No. 669,749.

The subject-matter of that application primarily involves the separation of soluble salts by dissolving out potassium chloride and borax from a mixture of potassium chloride, borax, sodium sulphate, sodium carbonate, and sodium chloride, and the separation of the potassium chloride and borax from each other by means of a hot solution saturated with respect to sodium carbonate, sodium chloride and sodium sulphate but unsaturated with respect to potassium chloride and borax.

The inventive concept of the present case is distinguishable therefrom in that it involves the separation of the sodium-chloride, sodium sulphate and sodium carbonate left undissolved by the aforementioned hot solution.

In carrying out the process of the present case, I first eliminate—preferably by solar evaporation—the water of solution from the brine so that a practically dry mixture of the salts is obtained. A hot saturated solution of all of these salts will carry a certain fixed amount of each salt, while if the temperature be normal, very much less potassium chloride and borax will be dissolved even though the other salts remain either in the same amount or dissolve in still greater amount. Consequently, if a cold saturated solution of all of the salts is heated—say to boiling temperature—together with a certain amount of the dehydrated brine-salts obtained initially (as above stated) from the natural brine, no further amount of sodium chloride, sodium carbonate, or sodium sulphate will dissolve; but, if the amount of solution is properly proportioned to the anhydrous salt used, all of the potassium chloride and borax will be dissolved therefrom. If, then, the hot solution be separated from the undissolved portion of the salt and the solution be allowed to cool to the same temperature at which it was before heating with the dehydrated salts, all of the potassium chloride and borax that was leached out of the dehydrated salts will crystallize from the solution and the solution will assume the same composition as it was before it was heated, and it can then be used to leach more potassium chloride and borax from those of the dehydrated brine salts. This operation may be repeated over and over.

The above-mentioned leaching of the dehydrated brine salts, together with the subsequent separation of the leaching solution from the undissolved salts, effectually causes separation of the contained potassium chloride and borax from the dehydrated brine salts, so that there is then left undissolved a mixture of sodium chloride, sodium carbonate and sodium sulphate.

This mixture (of undissolved salts) I separate from each other as follows: I first dissolve them, in water, using as small an amount of the water as is practicable. I then eliminate the sodium carbonate from the solution, preferably by subjecting the solution to the action of carbon dioxide, this acting to convert the sodium carbonate into sodium bicarbonate, which being nearly insoluble in the solution, precipitates therefrom, and may be separated therefrom by filtration or otherwise. This sodium bicarbonate can be washed and calcined to soda ash.

I next subject the solution to the action of ammonia which acts to cause practically perfect precipitation of the sodium sulphate therefrom. The resultant precipitate is separated from its mother liquor, is washed with warm water, and is then pure anhydrous sodium sulphate. I next subject the ammoniacal mother liquor to distillation which eliminates the ammonia therefrom. This eliminated ammonia can then be used to cause precipitation of sodium sulphate from more solution after elimination of sodium carbonate, as above described.

The residual solution, after distilling off the ammonia, is now a very pure solution of sodium chloride, containing only very small amounts of potassium chloride, borax, sodium carbonate and sodium sulphate. It is next evaporated by appropriate means and the sodium chloride recovered therefrom.

The mother liquor from this sodium chloride evaporation and crystallization, containing the small amounts of the other salts as stated, can be used to replace losses of water and solutions in the original mother liquor used to leach out potassium chloride and borax from the dehydrated brine salts.

What I claim is:

1. The process of separating soluble salts composed of chlorides, borates, carbonates, and sulphates of potassium and sodium, comprising separating the potassium chloride and borax therefrom by leaching; dissolving the remaining salts in water; eliminating the sodium carbonate from the solution; and precipitating the sodium sulphate therefrom with ammonia.

2. The process of separating soluble salts from each other, comprising eliminating all of the other salts except sodium chloride and sodium sulphate from a solution thereof and treating the solution with ammonia whereby the sodium sulphate is precipitated therefrom.

3. In the process of separating soluble salts composed of chlorides, borates, carbonates, and sulphates of potassium and sodium, those steps for separating the chloride, sulphate and carbonate of sodium from each other, which consists in dissolving them in water; treating the solution with carbon dioxide; separating the sodium bicarbonate from the liquor; partially saturating the separated liquor with ammonia; separating the precipitated sodium sulphate therefrom; distilling off the ammonia from the separated liquor; and evaporating this liquor to recover the sodium chloride.

4. The process of separating mixed salts composed of chlorides, borates, carbonates, and sulphates of potassium and sodium, comprising leaching the mixed salts with a hot solution saturated with respect to the chloride, sulphate and carbonate of sodium, but unsaturated with respect to potassium chloride and borax; separating the hot solution from the leached salts; recovering this solution after cooling to dissolve more potassium chloride and borax from more of the mixed salts; dissolving the undissolved sodium chloride, sodium sulphate and sodium carbonate in water; treating the solution with carbon dioxide; separating the sodium bicarbonate from the liquor; partially saturating the separated liquor with ammonia; separating the precipitated sodium sulphate therefrom; distilling off the ammonia from the separated liquor; and evaporating this liquor to recover the sodium chloride.

In testimony whereof I affix my signature.

CLINTON E. DOLBEAR.